United States Patent [19]

Wagner et al.

[11] E Re. 28,937

[45] Reissued Aug. 24, 1976

[54] CONTROL OF VISCOSITY AND POLYCAPROAMIDE DEGRADATION DURING VACUUM POLYCONDENSATION

[75] Inventors: John Walter Wagner, Petersburg; John Christopher Haylock, Richmond, both of Va.

[73] Assignee: Allied Chemical Corporation, Petersburg, Va.

[22] Filed: June 19, 1974

[21] Appl. No.: 480,667

Related U.S. Patent Documents

Reissue of:

[64] Patent No.: 3,753,955
Issued: Aug. 21, 1973
Appl. No.: 200,027
Filed: Nov. 18, 1971

[52] U.S. Cl. ..... 260/78 L; 260/78 A
[51] Int. Cl.[2] ..... C08G 69/16
[58] Field of Search ..... 260/78 A, 78 L

[56] References Cited

UNITED STATES PATENTS

| | | | |
|---|---|---|---|
| 2,731,081 | 1/1956 | Mayner | 260/78 L |
| 2,867,805 | 1/1959 | Ludewig | 260/78 L |
| 2,904,109 | 9/1959 | Malm | 159/14 X |
| 3,090,773 | 3/1963 | Papero et al. | 260/78 L |
| 3,386,967 | 6/1968 | Twilley | 260/78 L |
| 3,449,220 | 6/1969 | Geisler | 260/78 L X |
| 3,558,567 | 1/1971 | Twilley et al. | 260/78 L |
| 3,679,635 | 7/1972 | Portus | 260/78 L X |

FOREIGN PATENTS OR APPLICATIONS

| | | |
|---|---|---|
| 1,193,866 | 6/1970 | United Kingdom |

*Primary Examiner*—Howard E. Schain
*Attorney, Agent, or Firm*—Richard A. Anderson

[57] ABSTRACT

Control of polycaproamide degradation during vacuum polycondensation in a polymer finisher is achieved by maintaining a partial pressure of water above the polymer melt above about 10 mm. Hg, preferably above about 30 mm. Hg, absolute pressure. Degradation is minimized to within 3, preferably 2 units of the theoretical difference between carboxyl and amine ends. The water extractables content of the polymer is also controlled to below about 3.5% by weight, preferably 2.5%; viscosity increase of the polymer melt levels out after less than 4 hours to less than 10 FAV units per hour, by means of the invention.

3 Claims, 2 Drawing Figures

CONTROL OF VISCOSITY AND POLYCAPROAMIDE DEGRADATION DURING VACUUM POLYCONDENSATION

Matter enclosed in heavy brackets [ ] appears in the original patent but forms no part of this reissue specification; matter printed in italics indicates the additions made by reissue.

BACKGROUND OF THE INVENTION

This invention relates to a process for the polymerization of caprolactam or amino caproic acid. More specifically, this invention relates to a method to control thermal degradation and viscosity increase while removing extractables in a polymer finisher under vacuum.

The prior art patents, of which we are aware, considered to be most pertinent to this invention are U.S. 2,904,109 to Malm, U.S. 2,731,081 to Mayner, U.S. 3,578,640 to Twilley, Coli, Jr., and Roth J. and U.S. 3,526,484 to Kilpatrick. The pertinent portions of all the above patents are hereby incorporated by reference. The Malm and Mayner patents teach removing monomers from a polycaproamide melt by sweeping with steam prior to spinning. Kilpatrick and Twilley et al. teach direct spinning of nascent polymer but the monomer and other water extractables are removed by vacuum venting. These latter patents teach use of a polymer finisher (labeled 60 in the Twilley figure and labeled 8 in the Kilpatrick figures) but do not teach maintaining high partial pressure of steam in the finisher. Nor do these references teach control of polymer viscosity, or even recognize a polymer degradation problem in the finisher.

SUMMARY OF THE INVENTION

Control of polymer degradation and rate of polymer viscosity increase during the predominantly polycondensation reaction in the polymerization of polycaproamide in a polymer finisher at a temperature between about 225° C., and about 300° C. at an absolute pressure of from about 11, preferably 31 mm. Hg, to about 150 mm. Hg is achieved by sweeping the finisher with steam, the polymer melt preferably having a high surface area. The partial pressure of the steam in the vapor above the melt must be maintained above about 10 mm. Hg, preferably about 30 mm. Hg, to minimize thermal degradation of the polymer in the melt to within 3 units (at above 30 mm. Hg within 2 units) of the theoretical difference between amine ends and carboxyl ends. Also, the rate of polymer viscosity increase of the polymer melt will level out after less than 4 hours, preferably less than 3 hours, to less than 10 FAV units per hour by means of this steam purge in the finisher. This control of degradation and rate of viscosity increase is achieved without any penalty to extractables content. The water extractables in the spun polycaproamide can still be kept at below 3.5%, preferably below 2.5% by weight, even with the control of degradation and rate of viscosity increase. The preferred method to maintain this partial pressure of steam is by purging or sweeping the polymer finisher with steam overhead and counter to the flow of the polymer melt.

DESCRIPTION OF PREFERRED EMBODIMENTS

Figure 1:
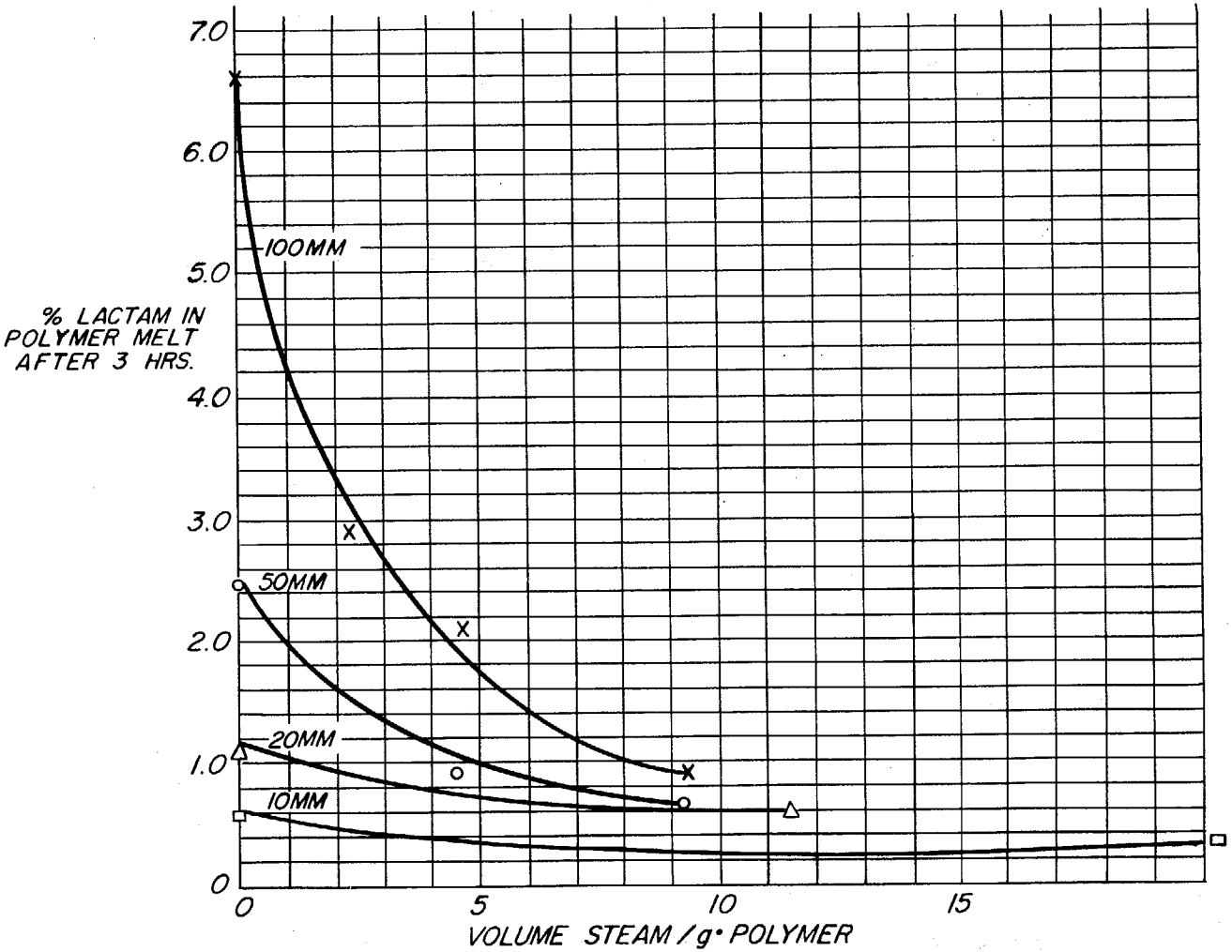

Apparatus to carry out the process of this invention is shown in the figure of U.S. 3,578,640 with the exception that the vacuum line 64 would be located at the polymer inlet end of the finisher 60 and a steam line would be installed at the polymer exit end of the finisher where vacuum line 64 is presently shown. Thus, steam would sweep overhead of the polymer melt in finisher 60, counter to the flow of the polymer melt. A more preferred polymer finisher, because it provides higher surface area to the polymer melt would be the finisher 8 in FIGS. 1, 2, and 5 of U.S. 3,526,484 equipped with a steam line and vacuum line to provide counter flow steam sweeping as described above.

A description of the method of determining the carboxyl groups or ends and amine groups or ends, the formic acid relative viscosity (FAV), the water extractables and the monomer content of the polycaproamide polymers prepared in the examples following is found in U.S. 3,578,640, Twilley et al., column 5, lines 24 to 47. The difference of ends or Δ ends is simply the arithmetic difference of the analytical determination of ends of carboxyls and the analytical determination of ends of amine. Amine ends are depicted [$NH_2$], carboxyl ends [COOH] and polymer is depicted [NHCO].

Previous work has shown that the presence of a phosphorous containing light-stabilizer causes considerable catalysis of polycondensation under vacuum. Although this reduces the polycondensation time and thus potentially increases the throughput of the polymer train, the viscosity becomes extremely difficult to control; a small difference in residence time causes a large difference in viscosity of the polymer melt. The presence of water in the polymer melt determines its viscosity since the viscosity stabilizes when the product of ends is in equilibrium with the water content.

$$\text{i.e.,}\quad \frac{[NH_2]\,[COOH]}{[NHCO]} = K[H_2O]$$

The water in the polymer melt also affects the rate of polymerization to this equilibrium point via the following kinetic equation.

$$\frac{d(FAV)}{dt} = k_1\,[NH_2]\,[COOH] - k_2\,[NHCO]\,[H_2O]$$

Thus, an increase in the water content reduces both the rate of approach to equilibrium and the formic acid viscosity at this equilibrium point.

It would appear obvious, therefore, that to stabilize the viscosity at a required value, the polymerization should be run at such a pressure that the partial pressure of the water in the vapor is in equilibrium with the water in the melt corresponding to the required viscosity. However, owing to the difference in boiling points and concentrations of water and lactam, the vapor above a polycaproamide polymer melt is composed mainly of lactam and an increase in the partial pressure of water leads to a corresponding increase in the vapor pressure of lactam. The lactam in the polymer melt then exceeds the level that can be tolerated for a direct spin process.

In order to separate these two apparently interdependent factors, it was decided to investigate the possibilities of using a steam sweep across the polymer melt. A high partial pressure water is then obtained, determined by the absolute steam pressure above the polymer melt, while a low partial pressure of lactam arises from the sweeping action of the steam. The steam pressure, therefore, controls the equilibrium viscosity and polymerization rate independently of the extractables level of the polymer melt which is controlled by the sweep rate.

This approach was investigated first in a research size reactor by conducting the polycondensation at known pressures between 5 mm. and 100 mm. and introducing water into the polymer melt at a constant rate during the final 2½ hours of the 3-hour polycondensation time. The generated steam sweep was varied by changing the water/polymer melt ratio and runs at different pressures were compared with runs at the same pressure in the absence of steam. The first results, tabulated below, are concerned with a medium-dyeing polymer using acetic acid and amino-propylmorpholine as terminators.

TABLE I.

EFFECT OF PRESSURE AND STEAM SWEEP ON A MEDIUM DYEING (B) POLYMER USING 100 cc's WATER IN 2½ HOURS, T.=260° C.

| | FAV | | | | Extractables | | | | Lactam | | | |
|---|---|---|---|---|---|---|---|---|---|---|---|---|
| | Sealed | | Steam | | Sealed | | Steam | | Sealed | | Steam | |
| Pressure | 0 hrs. | 3 hrs. | 0 hrs. | 3 hrs. | 0 hrs. | 3 hrs. | 0 hrs. | 3 hrs. | 0 hrs. | 3 hrs. | 0 hrs. | 3 hrs. |
| 5 mm | 21.5 | 46.6 | 23.3 | 48.2 | 10.05 | 2.31 | 10.17 | 2.45 | 8.56 | 0.64 | 8.73 | 0.43 |
| 10 mm | 22.1 | 45.5 | 23.0 | 50.0 | 9.73 | 2.24 | 9.67 | 1.97 | 8.15 | 0.58 | 8.20 | 0.32 |
| 20 mm | 21.2 | 46.4 | 21.7 | 46.1 | 10.47 | 3.08 | 10.51 | 2.62 | 8.85 | 1.07 | 8.38 | 0.69 |
| 50 mm | 25.3 | 44.4 | 29.5 | 48.8 | 9.76 | 4.18 | 9.26 | 2.70 | 8.14 | 2.62 | 7.34 | 0.92 |
| 100 mm | 26.9 | 37.2 | 27.4 | 45.4 | 9.78 | 9.13 | 9.56 | 4.87 | 7.16 | 6.59 | 7.72 | 2.84 |

TABLE II.

EFFECT OF GENERATED STEAM SWEEP AT CONSTANT PRESSURE ON A MEDIUM DYEING POLYMER (B) T.=260° C.

| | FAV | | Extractables, percent | | Lactam, percent | |
|---|---|---|---|---|---|---|
| | 0 hrs. | 3 hrs. | 0 hrs. | 3 hrs. | 0 hrs. | 3 hrs. |
| (i) Pressure=100 mm. | | | | | | |
| Conditions: | | | | | | |
| Sealed/800 g.polymer | 26.9 | 37.2 | 9.78 | 9.13 | 7.16 | 6.59 |
| 100 cc. $H_2O$/800 g. polymer | 27.4 | 45.4 | 10.50 | 4.87 | 7.72 | 2.84 |
| 200 cc. $H_2O$/800 g. polymer | 21.3 | 40.9 | 10.04 | 3.88 | 7.87 | 2.08 |
| 200 cc. $H_2O$/400 g.polymer | 24.1 | 43.5 | 9.18 | 2.57 | 6.67 | 0.90 |
| (ii) Pressure=50 mm. | | | | | | |
| Conditions: | | | | | | |
| Sealed/800 g. polymer | 25.3 | 44.4 | 9.76 | 4.18 | 8.14 | 2.62 |
| Sealed/800 g. polymer[1] | 22.6 | 61.3 | 8.91 | 4.66 | 6.89 | 2.40 |
| 100 cc. $H_2O$/800 g. polymer | 29.5 | 48.8 | 9.26 | 2.70 | 7.34 | 0.92 |
| 200 cc. $H_2O$/800 g. polymer[1] | 26.6 | 75.9 | 8.92 | 2.37 | 6.50 | 0.68 |
| 7 liter $N_2$/hr./800 g. polymer | 22.7 | 85.2 | 8.82 | 1.94 | 6.85 | 0.59 |

[1]Polymer contains manganese hypophosphite.

Similar experiments were carried out with a light-dyeing polymer and are tabulated below.

TABLE III.

EFFECT OF PRESSURE AND STEAM SWEEP ON A LIGHT-DYEING POLYMER USING 200 cc's WATER IN 2½ HRS.T.=260° C.

| | FAV | | | | Extractables | | | | Lactam | | | |
|---|---|---|---|---|---|---|---|---|---|---|---|---|
| | Sealed | | Steam | | Sealed | | Steam | | Sealed | | Steam | |
| Pressure | 0 hrs. | 3 hrs. | 0 hrs. | 3 hrs. | 0 hrs. | 3 hrs. | 0 hrs. | 3 hrs. | 0 hrs. | 3 hrs. | 0 hrs. | 3 hrs. |
| 5 mm.[1] | 24.4 | 150.7 | 29.8 | 123.4 | 9.76 | 2.13 | 8.90 | 1.83 | 6.25 | 0.29 | 6.67 | 0.11 |
| 50 mm.[1] | 24.4 | 107.9 | 28.0 | 111.4 | 9.71 | 4.61 | 9.92 | 2.46 | 6.92 | 2.49 | 6.55 | 0.48 |
| 100 mm.[1] | 29.8 | 75.1 | 30.9 | 104.2 | 9.41 | 8.18 | 9.56 | 2.78 | 7.37 | 6.49 | 6.74 | 0.88 |

[1]Polymer contains manganese hypophosphite.

TABLE IV.

EFFECT OF STEAM SWEEP ON END GROUP LEVEL OF A MEDIUM-DYEING POLYMER USING 200 cc's WATER IN 2½ HOURS. T.=260° C. (POLYMER LABELED "B")

| Pressure | Sealed—Difference of ends ($NH_2$—COOH) | Steam—Difference of ends ($NH_2$—COOH) |
|---|---|---|
| Starting material | 27.4 | 27.6 |
| 5 mm./3 hrs | 33.5 | 32.6 |
| 10 mm./3 hrs | 30.1 | 33.2 |
| 20 mm./3 hrs | 30.3 | 35.5 |
| 50 mm./3 hrs | 35.0 | 26.1 |
| 100 mm./3 hrs | 35.7 | 28.7 |

Extractables and monomer level

It is obvious from the above data that a steam sweep through the polymer melt considerably reduces its monomer content and, therefore, its extractables level. It also appears that, at a given volume of steam, the monomer in the melt is dependent on the steam pressure (see Table I). Of greater significance, however, is the demonstrated fact that an increase in the volume of steam per gm. of polymer swept through the melt, at constant steam pressures, leads to a further lowering of the monomer and extractables level (see Table II and FIG. 1). This suggests that the polymer melt extractables level is surface generation dependent, and the presence of a steam sweep in a reactor specifically designed for high surface generation, such as the "squirrel-cage" finisher designed for the direct-spin process, may give even lower extractables levels at the above pressures than those recorded with Research reactor.

Thermal degradation

The "sealed runs" reported in this investigation show a change in the difference of ends corresponding to a decarboxylation reaction. However, the presence of steam over the polymer melt and the consequent increase in the water content of the melt appears to afford some protection from this degradation reaction for the loss in carboxyl end groups is considerably reduced.

TABLE V.

EFFECT OF GENERATED STEAM SWEEP AT CONSTANT PRESSURE ON THE END GROUP LEVEL OF A MEDIUM-DYEING POLYMER. T=260° C.

| | Difference of ends ($NH_2$—COOH) | |
|---|---|---|
| (i) Pressure=100 mm. | | |
| Conditions: | | |
| Starting material | 29.4 | |
| Sealed/800 g. polymer/3 hrs | 35.9 | |
| 100 cc.'s $H_2O$/800 g. polymer/3 hrs | 28.7 | |
| 200 cc's $H_2O$/800 g. g. polymer/3 hrs | 27.0 | |
| 200 cc's $H_2O$/400 g. polymer/3 hrs | 27.3 | |
| (ii) Pressure=50 mm. | | |
| Conditions: | | |
| (a) Starting material | 29.8 | |
| Sealed/800 g./3 hrs | 35.1 | |
| 100 cc.'s $H_2O$/800 g./3 hrs | 26.3 | |
| | Difference of ends (COOH—$NH_2$) | |
| (b) Starting material | 3.6 | |
| | 3 hrs. | 6 hrs. |
| Sealed/800 g./3 hrs.[1] | 2.8 | −1.4 |
| 200 cc.'s $H_2O$/800 g./3 hrs.[1] | 4.1 | 4.4 |
| 7 liters $N_2$/hr./800 g./3 hrs.[1] | −0.2 | −4.6 |

[1]Polymer contains manganese hypophosphite.

TABLE VI.

EFFECT OF PRESSURE AND STEAM SWEEP ON THE END GROUP LEVEL OF A LIGHT-DYEING POLYMER USING 200 cc.'s WATER IN 2½ HRS. T.=260° C.

| | Sealed—Difference of ends (COOH—$NH_2$) | | Steam—Difference of ends (COOH—$NH_2$) | |
|---|---|---|---|---|
| | Starting material | | | |
| | 24.1 | | 23.2 | |
| | 3 hrs. | 6 hrs. | 3 hrs. | 6 hrs |
| 5 mm | 17.4 | 12.0 | 22.2 | 15.6 |
| 50 mm | 17.0 | 14.8 | 24.3 | 23.3 |
| 100 mm | 18.5 | 14.8 | 25.8 | 23.1 |

The data reported is consistent in that polymerizations conducted in the presence of a steam sweep show a much smaller loss in carboxyl groups compared to the corresponding pressure of a "sealed" system. It is interesting to note that effect is less pronounced at lower pressures—in a medium-dyeing polymer no significant protection is obtained below 20 mm. Above this pressure the difference of ends increases with decarboxylation in the "sealed" system but is unchanged in the presence of steam. (Tables IV and V.) The light-dyeing polymer, having a higher carboxyl end group content, would be expected to be more susceptible to decarboxylation and the difference between the carboxyl and amine group levels, therefore, decreases through decarboxylation. Again, the presence of steam protects the polymer, although the effect is less marked at lower pressure (Table VI).

It would appear from the data reported that the decarboxylation reaction is not dependent on the presence of phosphorous containing light stabilizers, but also occurs in a non-catalyzed polymer melt. The fact that the presence of steam significantly retards the decarboxylation suggests that water in the polymer melt is an important part of the decarboxylation mechanism and is involved in the rate-determining step. The exact mechanism of decarboxylation is not known, but a reaction between two carboxyl groups is possible.

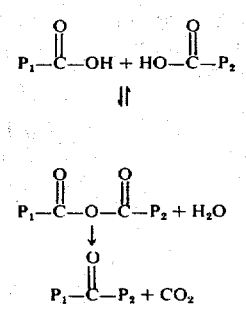

Although this is possible during the early stages of polymerization under vacuum and in an acid-terminated polymerization where there is a large excess of carboxyl groups, it becomes progressively less likely as the polymerization proceeds and the number of carboxyl end groups decreases.

A second mechanism has been suggested by Dr. H. Reimschuessel involving attack by the carboxyl groups in the polymer backbone amide bonds.

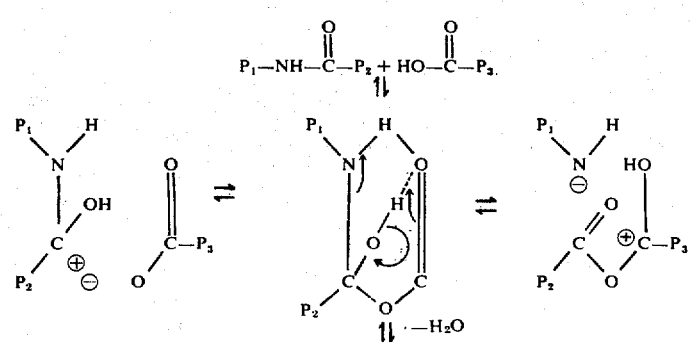

-continued

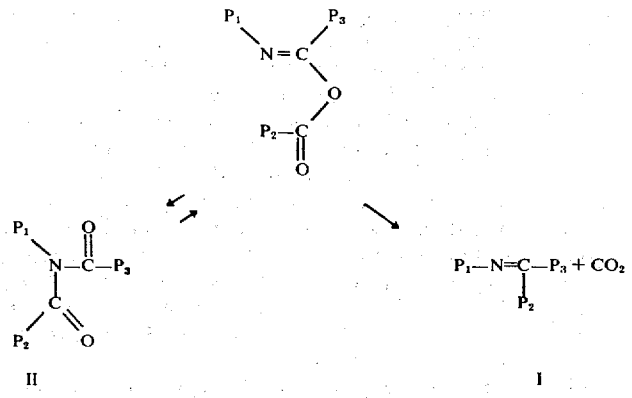

II I

Such reaction results in the loss of a carboxyl group and the gain of an amine since the Schiff base (I) will titrate as an amine. The gain in amines will not be exactly equivalent to the loss in carboxyl groups, however, since there is the possibility of reaction to the imide (II) which does not titrate as an amine. This loss in carboxyl groups and corresponding gain in amines has been noticed previously, and the reaction becomes more likely as the polymer viscosity increases since the mobility of the end groups decreases and the statistical chance of such a reaction increases at the expense of the carboxylamine amide condensation.

Extractables and monomer level

Trials were carried out in a pilot plant reactor at varying pressures from 5–90 mm. and at different steam flow rates. Table VII summarizes the conditions necessary for polymerization without steam.

TABLE VII.

EFFECT OF PRESSURE ON A LIGHT-DYEING POLYMER

| Batch | Pressure (mm.) | Vacuum conditions Time (hrs.) | Vacuum conditions Temp. (° C.) | FAV | Percent extractables | COOH—$NH_2$ | COOH—$NH_2$ (theoretical) |
|---|---|---|---|---|---|---|---|
| 1 | 5 | 2.17 | 249 | 49.5 | 2.2 | 48 | 60 |
| 2 | 5 | 2.07 | 245 | 48.0 | 2.3 | 44 | 60 |
| 3 | 5 | 2.20 | 245 | 46.0 | 2.3 | 44 | 60 |
| 4 | 60 | 4.55 | 243 | 48.0 | 5.4 | 44 | 52 |

Without the presence of the steam sweep a low pressure of 5 mm. is required for stripping of the excess monomer from the polymer melt to give an extractables level below 2.5%. The high degree of termination (60 equivalents of acetic acid) and the low temperature (245° C.) are required to give a polycondensation time of 2 hours. The difference of ends (COOH—$NH_2$=44) is smaller than the theoretical value of 60, which corresponds to the amount of terminator added.

Table VIII demonstrates the effect of steam on the reaction rate, extractables level and degradation. The steam flow rates, termination levels and pressure were varied and in each case the viscosity (estimated from the kw. reading of the agitator) rose rapidly to an equilibrium value, then remained constant at this value. These results are plotted graphically in FIG. 2. The heavy, black line 3 corresponds to polymerization at 5 mm. without steam.

TABLE VIII.

EFFECT OF PRESSURE AND STEAM SWEEP ON A LIGHT-DYEING POLYMER

| Batch | Pressure, mm. | Ml. water/mm. | Vacuum conditions Time | Vacuum conditions Temp., ° C. | FAV | Percent extractables | (COOH—NH) | Theoretical (COOH—NH) | Batch size, lbs. |
|---|---|---|---|---|---|---|---|---|---|
| 5 | 70 | 35 | 4.58 | 244 | 47 | 4.8 | 51 | 54 | 550 |
| 6 | 50 | 50 | 3.42 | 244 | 55 | 3.7 | 48 | 50 | 550 |
| 7 | 60 | 60 | 3.72 | 246 | 52 | 5.2 | 49 | 50 | 550 |
| 8 | 60 | 60 | 2.42 | 245 | 51 | 3.5 | 42 | 50 | 275 |
| 9 | 60 | 60 | 4.25 | 246 | 54 | 2.5 | 46 | 50 | 275 |
| 10 | 90 | 90 | 3.58 | 246 | 54 | 5.3 | 36 | 47 | 550 |
| 11 | 95 | 90 | 3.84 | 259 | 57 | 3.7 | 41 | 50 | 550 |
| 12 | 45 | 70 | 4.55 | 250 | 60 | 3.3 | 44 | 52 | 550 |

Viscosity control

Table VIII also shows that an acceptable extractables level of 3.5%, preferably 2.5%, was obtained at 60 mm. when the batch size was reduced by half and the steam sweep allowed to continue for 4¼ hours even after the target viscosity had been reached. This should be compared with an extractables level of 6% obtained at 60 mm. without steam sweep, and confirms the research data showing that surface generation and mass transfer are important in reducing the extractable level under a steam sweep.

Figure 2:
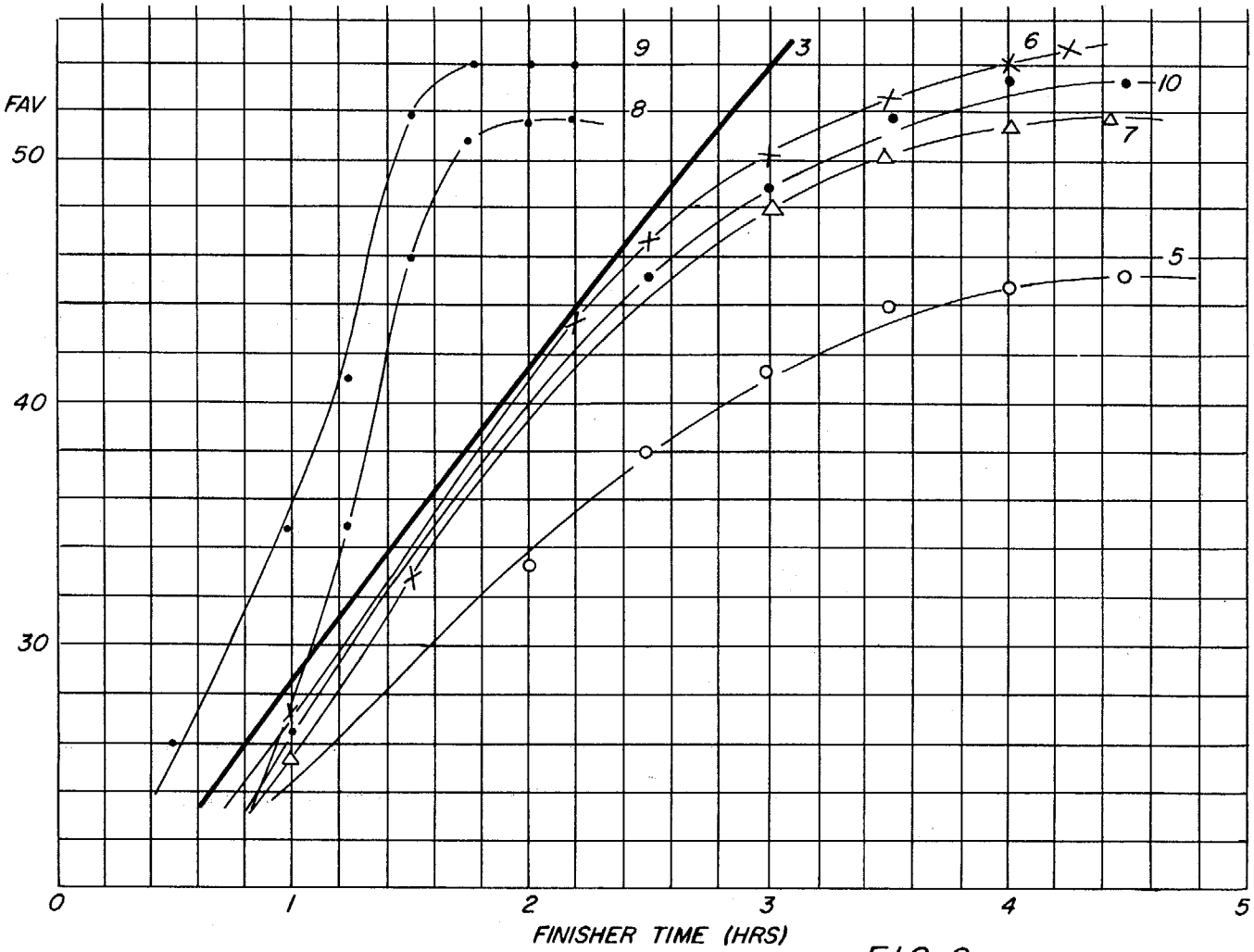

From FIG. 2, it can be seen that the presence of the steam sweep enables more effective control at the target viscosity—the change in viscosity being of the order of 3–4 units per hour compared to 10–12 units per hour at 5 mm. without steam. Numbers on the curves indicate batch numbers. In Table VIII an increase in the mass transfer and surface generation achieved by halving the batch size to 275 lbs. gives an increase in reaction rate and corresponding reduction in polymerization time. This is obtained without loss of viscosity control; for at the target viscosity, the rate of change is of the order of 1 unit per hour.

Thermal degradation

The pilot plant data also follows the research data in indicating that the presence of steam over the polymer melt protects it from loss of end groups by decarboxylation. In Table VIII, the difference of ends is much closer to the theoretical value required by the terminator content than is obtained at 5 mm. in the absence of steam (Table VII).

Experimental procedure: Research autoclave

Low molecular weight, unwashed polymer chips were fed into a nitrogen-purged autoclave and the reactor sealed under an internal nitrogen pressure of 25 p.s.i.g. External heating was applied until the internal temperature of the polymer, as measured by a thermocouple at the bottom of the hollow-shafted, double spiral agitator, was equal to the required temperature. A sample of the polymer was taken through the heated gate valve which was maintained at the same temperature as the polymer by a separate heater. Vacuum was then applied to the agitated system and the internal pressure decreased to the required operating value over a period of ½ hour. Water was then pulled into the reactor through the nitrogen purge tube which reached to the bottom of the polymer melt. The rate of water addition was controlled by a needle valve over a period of 3 hours. After 3 hours, under vacuum, a sample was taken through the gate valve and the reactor then pressurized with nitrogen and sealed at 25 p.s.i.g. The polymer was maintained at this temperature and pressure for a further 3 hours, taking samples every hour. Experiments were repeated, samples analyzed in duplicate and the average of the results used.

Low molecular weight polymers used (A) Light-dyeing polymer: 26 equivalents/$10^6$ g. of acetic acid termination. 10 p.p.m. manganese as manganous hypophosphite.

Theoretical Δ Ends 26 FAV=37; [COOH]=56; [$NH_2$]=31; Extractables=9.7%

(B) Medium-dyeing polymer: 26 equivalent/$10^6$ g. of acetic acid and 26 equivalents/$10^6$ g. of amino-propyl morpholine termination. No light stabilizer added.

Theoretical Δ Ends 26 FAV=17; [COOH]=60; [$NH_2$]=87; Extractables=10.9%

(C) Medium-dyeing polymer: 25 equivalents/10 g. of acetic acid and 25 equivalents/10 g. of cyclohexylamine termination. 10 p.p.m. manganese as manganous hypophosphite.

Theoretical Δ Ends 0 FAV=36; [COOH]=38; [$NH_2$]=33; Extractables=8.9%

EXPERIMENTAL RESULTS: RESEARCH AUTOCLAVE

1.
Polymer: A (800 g.)
Temperature: 260° C.
Pressure: 5 mm. Hg
Water added: 200 cc.'s in 3 hours

| Time (hrs.) | FAV | COOH, eq./$10^6$ g. | $NH_2$, eq./$10^6$ g. | Extractables percent | Lactam, percent |
|---|---|---|---|---|---|
| 0 | 29.8 | 63.2 | 40.3 | 8.90 | 6.67 |
| 3 | 123.4 | 34.3 | 12.1 | 1.83 | 0.11 |
| 4 | 132.3 | 33.4 | 11.1 | 1.98 | 0.22 |
| 5 | 148.3 | 30.8 | 11.2 | 2.13 | 0.34 |
| 6 | 160.1 | 29.3 | 13.7 | 2.13 | 0.46 |

2.
Polymer: A (800 g.)
Temperature: 260° C.
Pressure: 50 mm. Hg
Water added: 200 cc.'s in 3 hours

| | | | | | |
|---|---|---|---|---|---|
| 0 | 28.0 | 65.8 | 43.8 | 9.92 | 6.55 |
| 3 | 111.4 | 37.0 | 12.7 | 2.46 | 0.48 |
| 4 | 136.6 | 33.5 | 9.4 | 2.46 | 0.57 |
| 5 | 146.0 | 33.3 | 9.2 | 2.55 | 0.63 |
| 6 | 158.7 | 32.1 | 8.8 | 2.50 | 0.57 |

3.
Polymer: A (800 g.)
Temperature: 260° C.
Pressure: 100 mm. Hg
Water added: 200 cc.'s in 3 hours

| | | | | | |
|---|---|---|---|---|---|
| 0 | 30.9 | 66.1 | 41.5 | 9.56 | 6.74 |
| 3 | 104.2 | 39.6 | 13.8 | 2.78 | 0.88 |
| 4 | 111.4 | 38.1 | 13.4 | 2.95 | 0.92 |
| 5 | 116.2 | 37.8 | 10.6 | 2.97 | 0.80 |
| 6 | 120.8 | 33.8 | 9.7 | 2.95 | 0.80 |

4.
Polymer: A (800 g.)
Temperature: 260° C.
Pressure: 5 mm. Hg
Water added: No water added

| | | | | | |
|---|---|---|---|---|---|
| 0 | 24.4 | 71.1 | 47.7 | 9.76 | 6.25 |
| 3 | 150.7 | 28.4 | 11.0 | 2.13 | 0.29 |
| 4 | 158.8 | 25.5 | 11.0 | 2.28 | 0.42 |
| 5 | 170.2 | 23.2 | 10.4 | 2.34 | 0.40 |
| 6 | 185.8 | 22.4 | 10.4 | 2.46 | 0.41 |

5.
Polymer: A (800 g.)
Temperature: 260° C.
Pressure: 50 mm. Hg
Water added: No water added

| | | | | | |
|---|---|---|---|---|---|
| 0 | 24.4 | 74.7 | 50.1 | 9.71 | 6.92 |
| 3 | 107.9 | 30.9 | 13.9 | 4.61 | 2.49 |
| 4 | 119.2 | 29.1 | 13.6 | 4.70 | 2.35 |
| 5 | 131.0 | 27.3 | 12.7 | 4.82 | 2.34 |
| 6 | 140.9 | 27.1 | 12.3 | 4.52 | 2.32 |

6.
Polymer: A (800 g.)
Temperature: 260° C.
Pressure: 100 mm. Hg
Water added: No water added

| | | | | | |
|---|---|---|---|---|---|
| 0 | 29.8 | 61.1 | 40.4 | 9.41 | 7.37 |
| 3 | 75.1 | 32.6 | 16.8 | 8.18 | 6.49 |
| 4 | 81.5 | 31.0 | 15.7 | 8.39 | 6.55 |
| 5 | 86.3 | 28.5 | 14.7 | 8.25 | 6.53 |
| 6 | 93.1 | 25.3 | 14.5 | 7.68 | 6.44 |

7.
Polymer: B (800 g.)
Temperature: 260° C.
Pressure: 5 mm. Hg
Water added: 100 cc.'s in 3 hours

| | | | | | |
|---|---|---|---|---|---|
| 0 | 23.3 | 48.3 | 76.5 | 10.17 | 8.73 |
| 3 | 48.2 | 31.9 | 65.4 | 2.45 | 0.43 |

8.
Polymer: B (800 g.)
Temperature: 260° C.
Pressure: 10 mm. Hg
Water added: 100 cc.'s in 3 hours

| | | | | | |
|---|---|---|---|---|---|
| 0 | 23.0 | 50.8 | 75.7 | 9.67 | 8.20 |

-continued

EXPERIMENTAL RESULTS: RESEARCH AUTOCLAVE

| | | | | | |
|---|---|---|---|---|---|
| 3 | 50.0 | 31.9 | 62.0 | 1.97 | 0.32 |

9.
Polymer: B (800 g.)
Temperature: 260° C.
Pressure: 20 mm. Hg
Water added: 100 cc.'s in 3 hours

| | | | | | |
|---|---|---|---|---|---|
| 0 | 21.7 | 54.4 | 79.7 | 10.51 | 8.38 |
| 3 | 46.1 | 34.8 | 65.1 | 2.62 | 0.69 |

10.
Polymer: B (800 g.)
Temperature: 260° C.
Pressure: 50 mm. Hg
Water added: 100 cc.'s in 3 hours

| | | | | | |
|---|---|---|---|---|---|
| 0 | 29.5 | 39.5 | 68.0 | 9.26 | 7.34 |
| 3 | 48.8 | 29.8 | 56.1 | 2.70 | 0.92 |

11.
Polymer: B (800 g.)
Temperature: 260° C.
Pressure: 100 mm. Hg
Water added: 100 cc.'s in 3 hours

| | | | | | |
|---|---|---|---|---|---|
| 0 | 27.4 | 42.6 | 71.0 | 9.56 | 7.72 |
| 3 | 45.4 | 31.7 | 60.4 | 4.87 | 2.84 |

12.
Polymer: B (800 g.)
Temperature: 200° C.
Pressure: 100 mm. Hg
Water added: 200 cc.'s in 3 hours

| | | | | | |
|---|---|---|---|---|---|
| 0 | 21.3 | 54.2 | 81.9 | 10.04 | 7.87 |
| 3 | 40.9 | 36.4 | 63.3 | 3.88 | 2.08 |

13.
Polymer: B (400 g.)
Temperature: 260° C.
Pressure: 100 mm. Hg
Water added: 200 cc.'s in 3 hours

| | | | | | |
|---|---|---|---|---|---|
| 0 | 24.1 | 49.7 | 80.0 | 9.18 | 6.67 |
| 3 | 43.5 | 37.5 | 64.8 | 2.57 | 0.90 |

14.
Polymer: B (800 g.)
Temperature: 260° C.
Pressure: 5 mm. Hg
Water added: No water added

| | | | | | |
|---|---|---|---|---|---|
| 0 | 21.5 | 53.5 | 79.1 | 10.05 | 8.56 |
| 3 | 46.6 | 33.9 | 66.5 | 2.31 | 0.64 |

15.
Polymer: B (800 g.)
Temperature: 260° C.
Pressure: 10 mm. Hg
Water added: No water added

| | | | | | |
|---|---|---|---|---|---|
| 0 | 22.1 | 50.4 | 78.4 | 9.73 | 8.15 |
| 3 | 45.5 | 32.5 | 65.7 | 2.24 | 0.58 |

16.
Polymer: B (800 g.)
Temperature: 260° C.
Pressure: 20 mm. Hg
Water added: No water added

| | | | | | |
|---|---|---|---|---|---|
| 0 | 21.2 | 52.0 | 80.3 | 10.47 | 8.85 |
| 3 | 46.4 | 31.2 | 66.7 | 3.08 | 1.07 |

17.
Polymer: B (800 g.)
Temperature: 260° C.
Pressure: 50 mm. Hg
Water added: No water added

| | | | | | |
|---|---|---|---|---|---|
| 0 | 25.3 | 45.6 | 76.8 | 9.76 | 8.14 |
| 3 | 44.4 | 32.2 | 67.3 | 4.18 | 2.62 |

18.
Polymer: B (800 g.)
Temperature: 260° C.
Pressure: 100 mm. Hg
Water added: No water added

| | | | | | |
|---|---|---|---|---|---|
| 0 | 26.9 | 43.1 | 72.8 | 9.78 | 7.16 |
| 3 | 37.2 | 31.0 | 66.7 | 9.13 | 6.59 |

19.
Polymer C (800 g.)
Temperature: 260° C.

-continued

EXPERIMENTAL RESULTS: RESEARCH AUTOCLAVE
Pressure: 50 mm. Hg
Water added: No water added

| | | | | | |
|---|---|---|---|---|---|
| 0 | 22.6 | 60.4 | 57.9 | 8.91 | 6.89 |
| 3 | 61.3 | 26.9 | 24.1 | 4.66 | 2.40 |
| 4 | 65.9 | 23.4 | 23.0 | 4.79 | 2.61 |
| 5 | 70.3 | 21.3 | 22.5 | 4.60 | 2.51 |
| 6 | 74.7 | 19.9 | 21.3 | 4.49 | 2.29 |

20.
Polymer: C (800 g.)
Temperature: 260° C.
Pressure: 50 mm.
Water added: 7 liters nitrogen per hour over 3 hours

| | | | | | |
|---|---|---|---|---|---|
| 0 | 22.7 | 61.6 | 58.7 | 8.82 | 6.85 |
| 3 | 85.2 | 21.1 | 21.3 | 1.94 | 0.59 |
| 4 | 90.3 | 18.5 | 22.5 | 2.13 | 0.60 |
| 5 | 98.9 | 18.2 | 20.5 | 2.36 | 0.63 |
| 6 | 105.0 | 15.5 | 20.1 | 2.51 | 0.84 |

21.
Polymer: C (800 g.)
Temperature: 260° C.
Pressure: 50 mm. Hg
Water added: 200 cc.'s in 3 hours

| | | | | | |
|---|---|---|---|---|---|
| 0 | 26.6 | 55.2 | 49.8 | 8.92 | 6.50 |
| 3 | 75.9 | 25.3 | 21.2 | 2.37 | 0.68 |
| 4 | 83.7 | 23.1 | 21.5 | 2.59 | 0.85 |
| 5 | 92.9 | 22.7 | 17.2 | 2.52 | 0.78 |
| 6 | 99.9 | 20.2 | 15.8 | 2.46 | 0.83 |

Table IX shows more explicitly using data from Experimental Results as shown, how polymer degradation is controlled. Maintaining partial pressure of steam above 10, preferably above 30 mm. Hg, the deviation from theoretical difference of ends can be controlled to within 3, preferably 2 (at above 30 mm. Hg) of steam partial pressure.

TABLE IX.

VACUUM DEGRADATION CONTROL

| Data from experimental results in table | Total pressure, mm. Hg | Steam pressure, mm. Hg | Polymer degradation, deviation from theoretical Δ ends |
|---|---|---|---|
| 14 | 5 | 0 | 5.8 |
| 15 | 10 | 4 | 6.4 |
| 16 | 20 | 2 | 8.7 |
| 17 | 50 | 5 | 8.2 |
| 18 | 100 | 0 | 8.9 |
| 7 | 5 | 0 | 6.7 |
| 8 | 10 | 7 | 3.3 |
| 9 | 20 | 9 | 3.5 |
| 10 | 50 | 35 | 0 |
| 11 | 100 | 56 | 1.9 |
| 12 | 100 | 72 | 0.1 |
| 13 | 100 | 95 | 0.5 |

In tests 14 through 18 the system was dehydrated resulting in severe polymer degradation.

In tests 7 through 11, water was added to the system to maintain varying partial pressures. The degradation decreased as the steam press was increased.

In tests 12 and 13, the water addition rate was increased to give higher steam partial pressure, which further reduced the degradation.

Conclusion: The partial pressure of water vapor of over about 10 mm. Hg or preferably over about 30 mm. Hg in the vapor over a polymer melt will greatly reduce the degradation of the polymer.

FIG. 1 and Table X, using data from the Experimental Results as shown, will show the effect of steam stripping on polymer extractable levels. Note that by using steam purge or sweep, extractables can be kept below 3.5%, preferably 2.5% by weight without resorting to the extremely low pressures of the prior art.

TABLE X.

EFFECT OF STEAM STRIPPING ON THE POLYMER EXTRACTABLES LEVELS

| | Sealed[1] | | 100 cc. $H_2O$[1] | |
|---|---|---|---|---|
| Pressure | Percent extractables | Percent lactam | Percent extractables | Percent lactam |
| Starting material | 9.98 | 7.43 | 9.98 | 7.43 |
| 5 mm | 2.33 | 0.64 | 2.45 | 0.42 |
| 10 mm | 2.24 | 0.58 | 1.97 | 0.31 |
| 20 mm | 3.09 | 1.07 | 2.62 | 0.69 |
| 50 mm | 4.18 | 2.62 | 2.71 | 0.93 |
| 100 mm | 9.13 | 6.59 | 4.87 | 2.84 |
| 100 mm./200 cc | | | 2.84 | 2.08 |
| 100 mm./200 cc./400 g. | | | 2.57 | 0.90 |

[1]800 gram charge, no manganous hypophosphite.

What is claimed is:

1. In a process for the production of polycaproamide shaped articles from molten anhydrous nascent polymer comprising:

a. continuously polymerizing ε-caprolactam at an elevated pressure and temperature in the presence of small amounts of water and a terminating agent to form a prepolymer melt, then b. continuously removing most of the water and part of unreacted lactam from said prepolymer melt by exposure to vacuum in a vessel providing said prepolymer melt with large surface area-to-volume ratio, residence time in said vessel being about 10 minutes, *wherein said polymer is not contacted with a gas following said polymerization*, then c. continuously transferring said melt to a surface renewal device also having large surface area-to-volume ratio, which promotes completion of the polymerization reaction by polycondensation, and removes residual amounts of vaporizable materials, at a temperature between about 225°C. and about 300°C., and a residence time of more than 1 hour, then d. continuously extruding said melt, and finally e. cooling said extruded polymer to form uniformly shaped articles the improvement [ comprising ] *consisting essentially of the combination of* carrying out step (c) at an absolute pressure of between about 31 mm. and about 150 mm. of Hg., subjecting said melt in step (c) to be sweeping flow of steam, and maintaining the partial pressure of said steam in the vapor above said melt at above about 30 mm Hg.

[ so that ] *keeping* the extractables content of said [ polycaproamide ] *polycaprolactam* at the end of said polymerization [ is ] below 3.5% by weight,

*minimizing* thermal degradation of the polymer in the melt [ is minimized ] to within 3 units of the theoretical difference of ends, and

*controlling* the rate viscosity increase of the polymer melt *to* level [ s ] out after less than four hours to less than 10 FAV units per hour.

2. The process of claim 1 wherein said viscosity increase is less than 8 FAV units after less than 3 hours, and thermal degradation is minimized to within 3 units of the theoretical difference of ends.

3. The process of claim 1 wherein said partial pressure of steam is maintained by sweeping steam overhead and counter to the flow of said polymer melt.

* * * * *